United States Patent
Morrison et al.

(10) Patent No.: US 9,211,589 B2
(45) Date of Patent: Dec. 15, 2015

(54) DOUBLE-SIDED, NONAGON CUTTING INSERT

(71) Applicant: Kennametal Inc., Latrobe, PA (US)

(72) Inventors: Lewis Ray Morrison, Latrobe, PA (US); Ravishankar Iyer, North Huntingdon, PA (US)

(73) Assignee: KENNAMETAL INC., Latrobe, PA (US)

(*) Notice: Subject to any disclaimer, the term of this patent is extended or adjusted under 35 U.S.C. 154(b) by 210 days.

(21) Appl. No.: 14/048,676

(22) Filed: Oct. 8, 2013

(65) Prior Publication Data

US 2015/0098768 A1    Apr. 9, 2015

(51) Int. Cl.
*B23B 27/16* (2006.01)
*B23B 27/14* (2006.01)
*B23C 5/20* (2006.01)

(52) U.S. Cl.
CPC ........... *B23B 27/1611* (2013.01); *B23B 27/145* (2013.01); *B23B 2200/04* (2013.01); *B23B 2200/202* (2013.01); *B23B 2200/204* (2013.01); *B23B 2200/3627* (2013.01)

(58) Field of Classification Search
CPC .............. B23C 2210/20; B23C 2210/207; B23C 2210/208; B23B 2251/20; B23B 2251/208
USPC .................. 407/113, 114, 115, 116
See application file for complete search history.

(56) References Cited

U.S. PATENT DOCUMENTS

| | | |
|---|---|---|
| 4,341,493 A | 7/1982 | Erkfritz |
| 4,470,731 A | 9/1984 | Erkfritz |
| 4,556,345 A | 12/1985 | Philippi |
| 4,575,287 A | 3/1986 | Oshnock et al. |
| 4,597,695 A | 7/1986 | Johnson |
| 4,631,994 A | 12/1986 | Jester et al. |
| 4,848,977 A | 7/1989 | Kieninger |
| 5,816,751 A | 10/1998 | Frecska |
| 6,523,768 B2 | 2/2003 | Recker et al. |
| 6,607,335 B2 * | 8/2003 | Morgulis ........... 407/40 |
| 6,733,212 B2 | 5/2004 | Nagaya et al. |

(Continued)

FOREIGN PATENT DOCUMENTS

| | | |
|---|---|---|
| EP | 2614908 A1 | 7/2013 |
| FR | 2894858 A1 | 6/2007 |

(Continued)

OTHER PUBLICATIONS

"Milling Cutters", http://wvvw.prezisstools.com/face-milling-cutters-and-circular-milling-cutters.html.

(Continued)

*Primary Examiner* — Will Fridie, Jr.
(74) *Attorney, Agent, or Firm* — Larry R. Meenan

(57) ABSTRACT

A double-sided, nonagon cutting insert includes a top surface, a bottom surface identical to the top surface, nine side surfaces that are identical to each other, a cutting edge formed at an intersection between each of the nine side surfaces and the top and bottom surfaces for a total of eighteen cutting edges, and nine corner radiuses identical to each other, each corner radius extending between the top and bottom surfaces and each of the nine side surfaces. Each cutting edge has a non-symmetric profile with respect to a central, longitudinal axis. The non-symmetrical profile of the cutting edge has the technical advantage of providing a variable cutting force, particularly during fine finishing cutting operations.

19 Claims, 4 Drawing Sheets

(56) References Cited

U.S. PATENT DOCUMENTS

| | | | |
|---|---|---|---|
| D523,040 S | 6/2006 | Niebauer et al. | |
| 7,086,812 B2 | 8/2006 | Gamble et al. | |
| 7,131,794 B2 | 11/2006 | Robinson et al. | |
| 7,367,753 B2 | 5/2008 | Maurer | |
| 7,390,150 B2 | 6/2008 | Kocherovsky et al. | |
| 7,410,332 B2 * | 8/2008 | Scherbarth | 407/113 |
| 7,513,717 B2 | 4/2009 | Engström et al. | |
| 7,976,250 B2 | 7/2011 | Fang et al. | |
| 7,997,833 B2 | 8/2011 | Hayashizaki et al. | |
| 8,282,320 B2 | 10/2012 | Hartlohner et al. | |
| 8,337,123 B2 | 12/2012 | Ishida | |
| 8,434,974 B2 | 5/2013 | Spitzenberger | |
| 8,454,278 B2 | 6/2013 | Hartlohner et al. | |
| D710,409 S | 8/2014 | Morrison et al. | |
| D713,433 S | 9/2014 | Morrison et al. | |
| 2009/0285646 A1 | 11/2009 | Oprasic et al. | |
| 2010/0129167 A1 | 5/2010 | Morrison | |
| 2010/0150671 A1 | 6/2010 | Oprasic et al. | |
| 2010/0221076 A1 * | 9/2010 | Takahashi et al. | 407/42 |
| 2011/0305535 A1 * | 12/2011 | Jansson | 407/103 |
| 2012/0051852 A1 | 3/2012 | Choi et al. | |
| 2012/0051855 A1 | 3/2012 | Lof | |
| 2012/0070239 A1 * | 3/2012 | Park et al. | 407/42 |
| 2013/0195567 A1 | 8/2013 | Sunnvius et al. | |
| 2014/0086696 A1 * | 3/2014 | Fang et al. | 407/99 |
| 2015/0165527 A1 * | 6/2015 | Roman | 407/113 |

FOREIGN PATENT DOCUMENTS

| | | |
|---|---|---|
| GB | 1164322 | 9/1969 |
| JP | 2004209615 A | 7/2004 |

OTHER PUBLICATIONS

"Tungmill", http://vvww.imc-companies.com/Tungaloy/tcat/familyhdr.asp?fnum=44&app=802&mapp=IT&GFSTYP=M&lang=EN&type=1.

* cited by examiner

DOUBLE-SIDED, NONAGON CUTTING INSERT

BACKGROUND OF THE INVENTION

1. Field of the Invention

The invention pertains to the field of indexable cutting inserts. More particularly, the invention pertains to an indexable, double sided, nonagon cutting insert.

2. Description of Related Art

Modern high-performance cutting tools use replaceable and typically indexable inserts owing to the high cutting speeds and feeds supported by the superior insert materials. Common materials for inserts include tungsten carbide, polycrystalline diamond and cubic boron nitride.

Indexable inserts use a symmetrical polygonal shape, such that when the first cutting edge is blunt they can be rotated or flipped over, presenting a fresh cutting edge which is accurately located at the same geometrical position. Geometrical repeatability saves time in manufacturing by allowing periodical cutting edge renewal without the need for tool grinding, setup changes, or entering of new values into a CNC program.

Common shapes of indexable inserts include square, triangular and rhombus (diamond) providing four, three and two cutting edges, respectively, on each side of the insert. A double-sided or invertible square insert, for example, can be flipped over to provide eight cutting edges.

The number of cutting edges is directly related to the cost per edge of the cutting insert. The more cutting edges that are available, the more the cutting insert has value. Thus, it is desirable to provide a cutting insert with multiple cutting edges.

SUMMARY OF THE INVENTION

The problem of reducing the cost of the cutting insert is solved by providing a double-sided, indexable, nonagon cutting insert. Also, the problem of providing a variable cutting force is solved by providing a cutting edge with a non-symmetric profile.

In one aspect of the invention, a double-sided, nonagon cutting insert comprises a top surface; a bottom surface identical to the top surface; nine side surfaces that are identical to each other; a cutting edge formed at an intersection between each of the nine side surfaces and the top and bottom surfaces for a total of eighteen cutting edges; and nine corner radiuses identical to each other, each corner radius extending between the top and bottom surfaces and each of the nine side surfaces, wherein each cutting edge has a non-symmetric profile with respect to a central, longitudinal axis of the cutting insert. The non-symmetrical profile of the cutting edge has the technical advantage of providing a variable cutting force during fine finishing cutting operations.

In another aspect of the invention, a double-sided, nonagon cutting insert comprises a top surface; a bottom surface identical to the top surface; a plurality of side surfaces that are identical to each other; a cutting edge formed at an intersection between each of the plurality of side surfaces and the top and bottom surfaces; and a plurality of corner radiuses identical to each other, each corner radius extending between the top and bottom surfaces and each of the plurality of side surfaces, wherein each cutting edge has a length, CL, that extends from one of the corner radiuses to an adjacent corner radius. The cutting edge starts at a point, B, and tapers downward to a point, C, for a distance equal to 0.10 to 0.20 times the length, CL, of the cutting edge. The cutting edge tapers downward from the point, C, to a point, D, for a distance equal to 0.45 to 0.60 times the length, CL, of the cutting edge to the maximum drop of the cutting insert. The cutting edge tapers upward from the point D to a point E for a distance equal to 0.20 to 0.45 times the length, CL, of the cutting edge.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
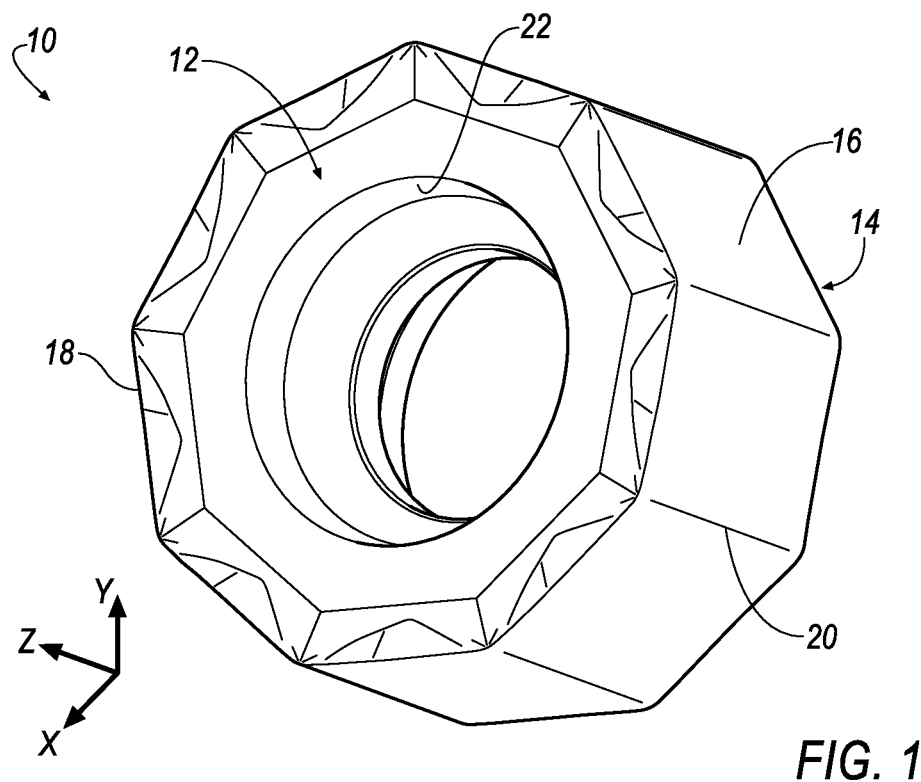
FIG. 1 is an isometric view of a cutting insert in accordance with an embodiment of the invention.
Figure 2:
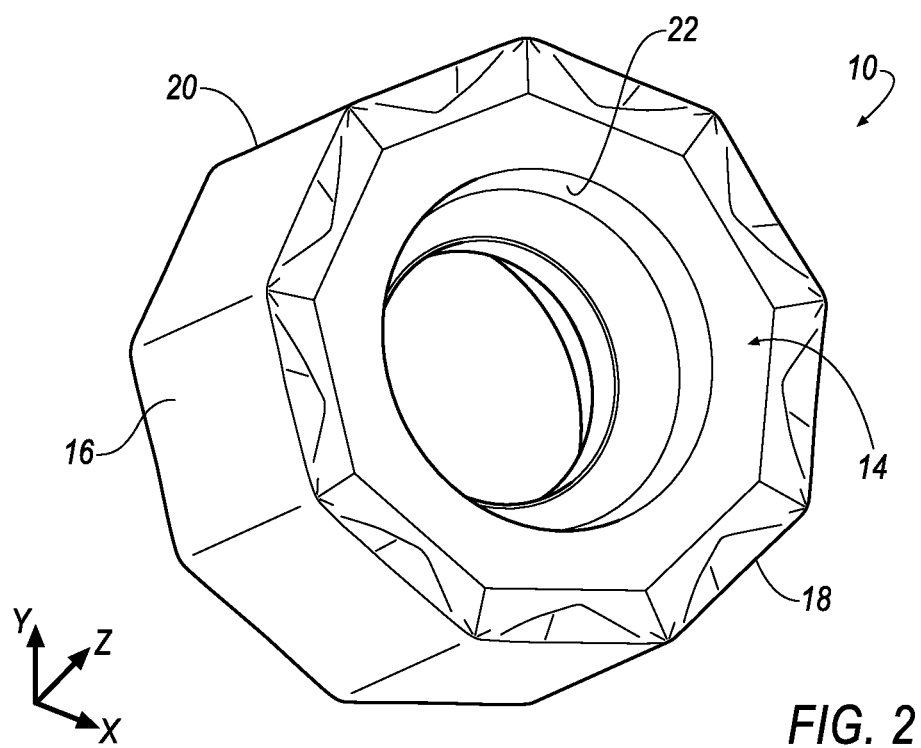
FIG. 2 is an another isometric view of the cutting insert of FIG. 1.
Figure 3:
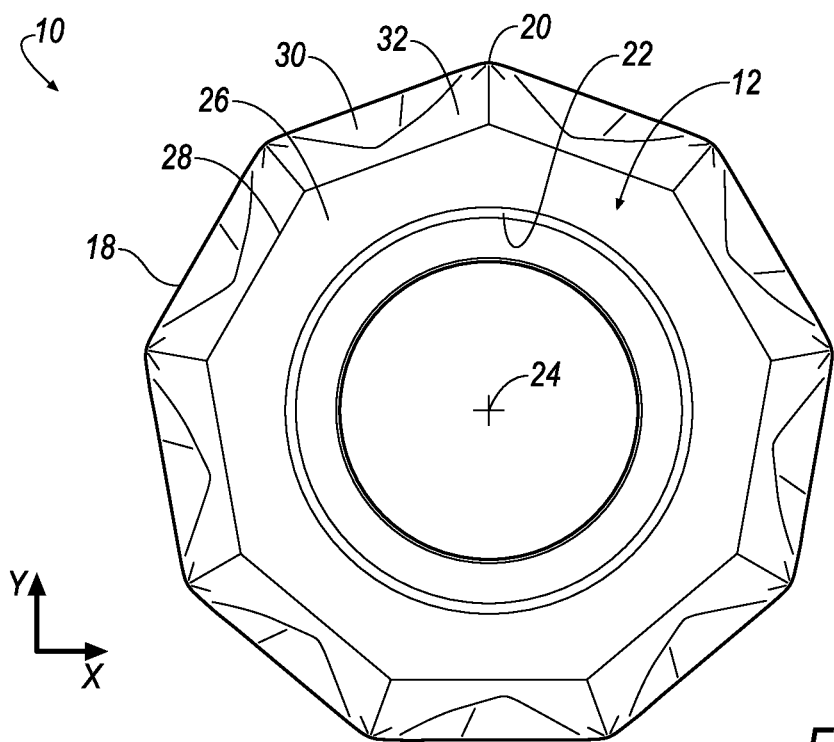
FIG. 3 is a top view of the cutting insert of FIG. 1.
Figure 4:
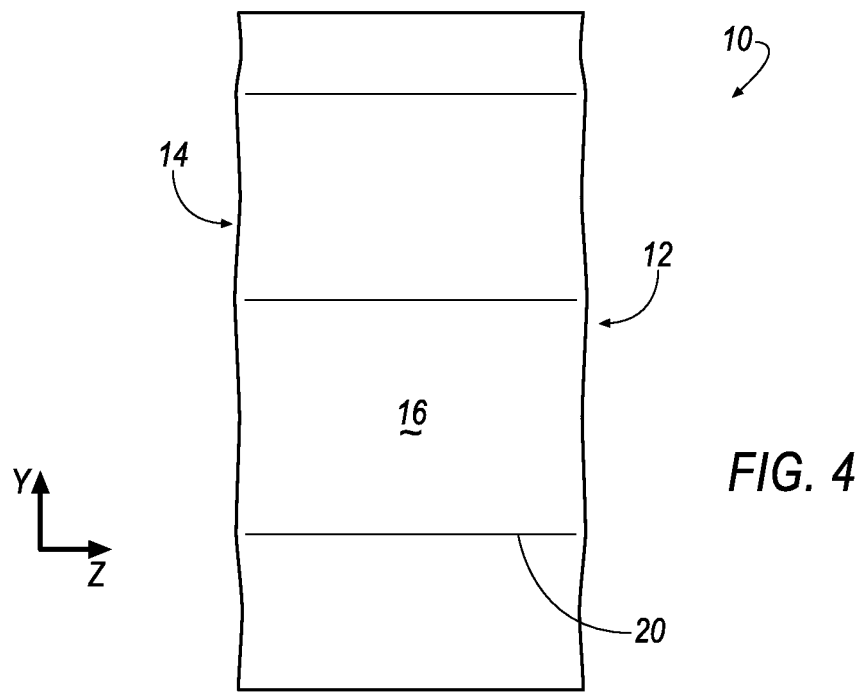
FIG. 4 is a side view of the cutting insert of FIG. 1.

Referring now to FIGS. 1-4, a cutting insert 10 is generally shown according to an embodiment of the invention. In general, the cutting insert 10 is a double-sided, nonagon cutting insert having nine (9) cutting edges on each side for a total of eighteen (18) cutting edges.

In geometry, a nonagon (or enneagon) is a nine-sided regular polygon. A regular nonagon has an internal angle of 140°. The area of a regular nonagon of side length a is given by:

$$A = \frac{9}{4}a^2 \cot\frac{\pi}{9} \simeq 6.18182a^2 \qquad (1)$$

The cutting insert 10 includes a first surface 12, a second surface 14 opposite the first surface 14 and a plurality of side surfaces 16 extending between the first surface 12 and the second surface 14. The first and second surfaces 12, 14 are identical to each other. Thus, only the first surface 12 will be discussed herein for brevity, and it will be appreciated that any description herein regarding the first surface 12 also applies to the second surface 14.

One aspect of the invention is that the cutting insert 10 includes a total of nine (9) side surfaces 16. Each side surface 16 is identical to each other. Thus, only one side surface 16 will be described herein for brevity, and it will be appreciated that any description herein of one of the side surfaces 16 applies to all the side surfaces 16.

A cutting edge 18 is formed at the intersection between the first surface 12 and each side surface 16 for a total of nine (9) cutting edges 18. In addition, a cutting edge 18 is formed at the intersection between the second surface 14 and each side surface 16 for a total of nine (9) additional cutting edge 18 (i.e. a total of eighteen (18) cutting edges for the cutting insert 10). Each cutting edge 18 is identical to each other. Thus, only one cutting edge 18 will be described herein for brevity, and it will be appreciated that any description herein of one cutting edge 18 applies to all the cutting edges 18.

A corner radius 20 connects each side surface 16 and extends between the first surface 12 and the second surface 14. Each corner radius 20 is identical to each other. Thus, only one corner radius 20 is discussed herein for brevity, and it will be appreciated that any description herein of one corner radius 20 applies to all corner radii 20.

The cutting insert 10 also include a countersunk bore 22 extending through the first and second surfaces 12, 14, and a central, longitudinal axis 24. It should be appreciated that the cutting insert is mirror symmetric about all three axes (x-, y- and z-axes). As a result, the cutting insert 10 comprises a double-sided cutting insert in which all eighteen (18) cutting edges 18 at the intersection between the side surfaces 16 and each of the first and second surfaces 12, 14 can separately be used in a machining operation.

The first surface 12 (and also the second surface 14) has a topography including a substantially planar central region 26 surrounding the countersunk bore 22. The central region 26 extends from the countersunk bore 22 an terminates in a nonagon-shaped boundary 28. The first surface 12 also includes a rake face 30 extending radially inward from each cutting edge 18. Each rake face 30 has a V-shaped configuration that is wider at the cutting edge 18. Each rake face 30 is higher in elevation than the central region 26. As such, a transition region 32 extends between each rake face 30 and the central region 26 and slopes downward from the rake face 30 toward the central region 26.

Each cutting edge 18 has a cutting edge length, CL, given by:

$$CL = IC \tan\left[\frac{180°}{\#CE}\right] - CR \quad (2)$$

where,
  IC is the diameter of an inscribed circle of the cutting insert 10;
  #CE is the number of cutting edges 18 (i.e. equal to 9); and
  CR is the magnitude of the corner radius 20. For example, for a corner radius equal to 0.8 mm, CR is equal to 0.8.

Thus, for the nonagon cutting insert 10 of the invention, the #CE is equal to 9. Thus, each cutting edge 18 of the cutting insert 10 has a cutting edge length, CL, given by:

$$CL = IC \tan(20°) - CR \quad (3)$$

An inscribed circle is the largest possible circle that can be drawn inside the cutting insert 10. It should be appreciated that for a polygon, a circle is not actually inscribed unless each side 16 of the cutting insert 10 is tangent to the circle. For a regular polygon, such as the cutting insert 10, an inscribed circle touches the midpoint of each side 16. By contrast, a circumscribed circle touches the corner radius 20 between each side 16 of the cutting insert 10. As will be appreciated, the diameter of the inscribed circle is a function of the size of the cutting insert 10. The larger the cutting insert 10, the larger the diameter of the inscribed circle that can be drawn so as to touch each of the cutting edges 18.

Figure 5:
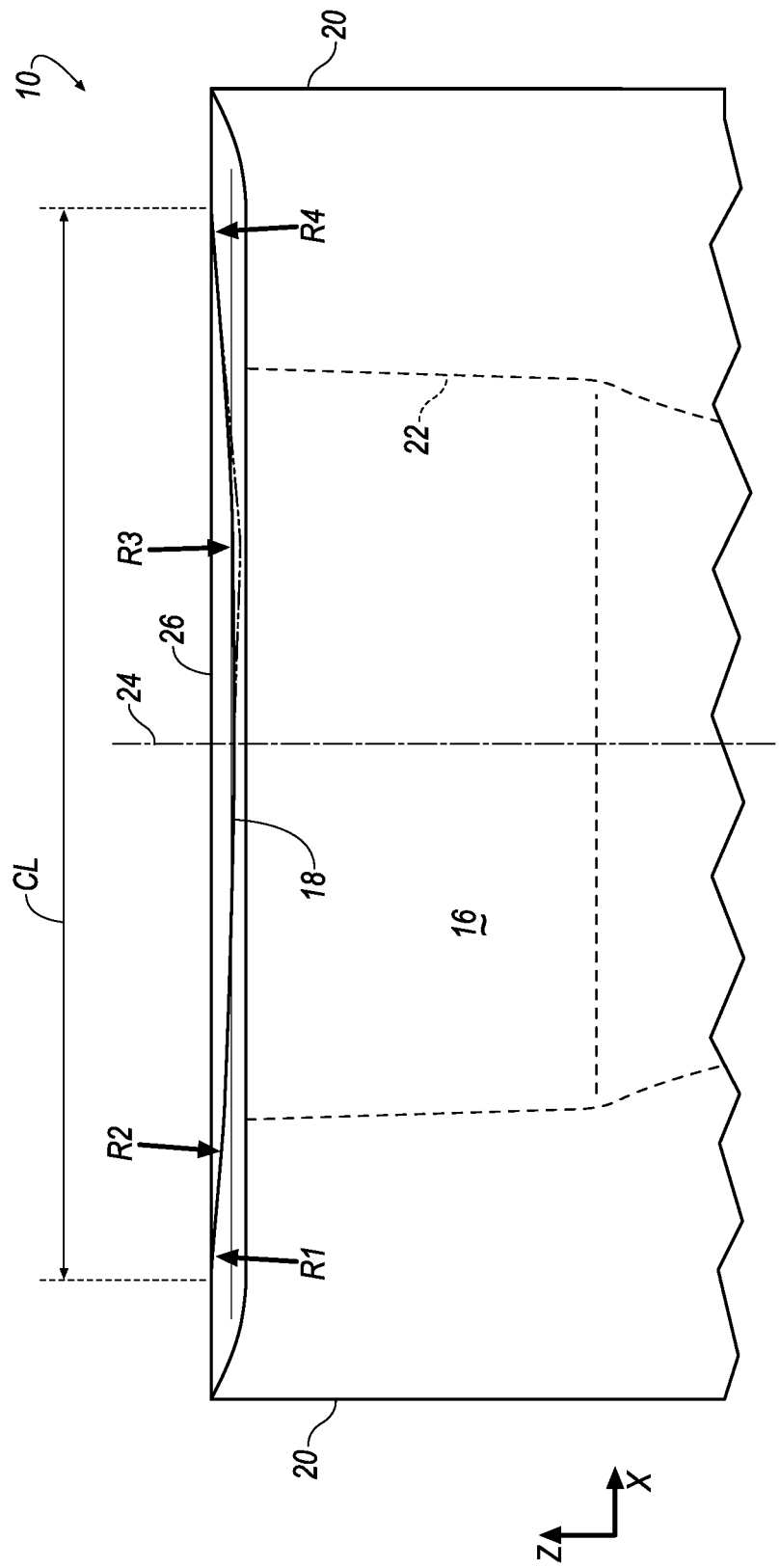
FIG. 5 is an enlarged side view of the cutting insert of FIG. 1 showing the non-symmetric profile of the cutting edge.
Figure 6:
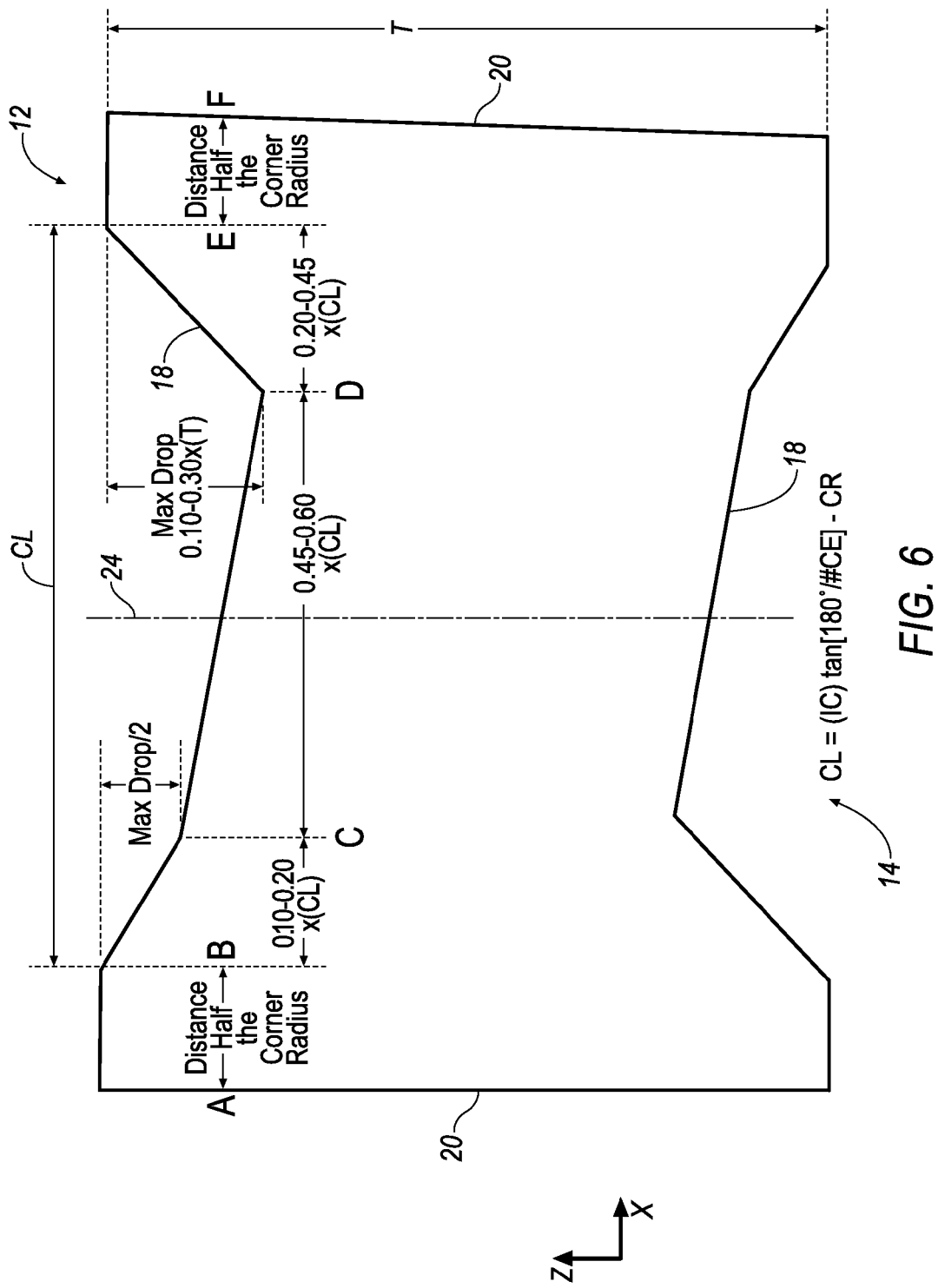
FIG. 6 is a schematic diagram of the non-symmetric profile of the cutting edge shown in FIG. 5.

According to one aspect of the invention, each cutting edge 18 formed at the intersection between the top surface 12 and each side surface 16 (and also the bottom surface 14 and each side surface 16) has a profile as shown in FIGS. 5 and 6. In general, each cutting edge 18 has a non-symmetric profile with respect a plane passing through the central, longitudinal axis 24 of the cutting insert 10. From left to right as shown in FIGS. 5 and 6, the distance from the point A to a point B is one-half the total length of the corner radius 20. From the point A to the point B, the cutting insert 10 has a profile that is substantially parallel to a horizontal axis (or X-axis). Then, the cutting edge 18 starts at the point B and tapers downward to a point C for a distance equal to 0.10 to 0.20 times the length, CL, of the cutting edge 18. The amount of downward taper is equal to one-half of a maximum drop of the cutting edge 18. The maximum drop of the cutting edge is a function of the thickness, T, of the cutting insert 10. For example, the maximum drop of the cutting insert 10 can be equal to 0.10 to 0.30 times the thickness, T, of the cutting insert 10, where the thickness, T, of the cutting insert is between about 5 mm and about 7 mm. The cutting edge 18 may be formed with a first radius, R1, proximate the point B and a second radius, R2, proximate the point C. The first radius, R1, is smaller than the second radius, R2.

Then, the cutting edge 18 tapers downward from the point C to a point D for a distance equal to 0.45 to 0.60 times the length, CL, of the cutting edge 18. At point D, the cutting edge 18 has a maximum drop equal to 0.10 to 0.30 times the thickness, T, of the cutting insert 10. The cutting edge 18 may be formed with a third radius, R3, proximate the point D. The third radius, R3, is larger than the first radius, R1, and the second radius, R2. Then, the cutting edge 18 tapers upward from the point D to a point E for a distance equal to 0.20 to 0.45 times the length, CL, of the cutting edge 18. The point E is located at one-half the total length of the corner radius 20. From the point E to the point F, the profile of the cutting insert 10 is substantially parallel to a horizontal axis (or X-axis), similar to the profile from the point A to the point B. The cutting edge 18 may be formed with a fourth radius, R4, proximate the point E. The fourth radius, R4, is smaller than the first radius, R1, the second radius, R2, the third radius, R3.

As shown in FIGS. 5 and 6, the length, CL, of the cutting edge 18 is the distance from the point B and point E. Because the cutting insert 10 is symmetric about all three axes, it will be appreciated that the profile of the cutting edge 18 formed at the intersection between the bottom surface 14 and each side surface 16 is identical to the profile of the cutting edge 18 formed at the intersection between the top surface 12 and each side surface 16 described above, but is mirror symmetric with respect to the central, longitudinal axis 24, as shown in FIG. 6.

The non-symmetrical profile of the cutting edge 18 has the technical advantage of providing a variable cutting force during fine finishing cutting operations.

The patents and publications referred to herein are hereby incorporated by reference.

Having described presently preferred embodiments the invention may be otherwise embodied within the scope of the appended claims.

What is claimed is:

1. A double-sided, nonagon cutting insert, comprising:
   a top surface;
   a bottom surface identical to the top surface;
   nine side surfaces that are identical to each other;
   a cutting edge formed at an intersection between each of the nine side surfaces and the top and bottom surfaces for a total of eighteen cutting edges; and
   nine corner radiuses identical to each other, each corner radius extending between the top and bottom surfaces and each of the nine side surfaces,
   wherein each cutting edge has a non-symmetric profile with respect to a central, longitudinal axis of the cutting insert, and
   wherein each cutting edge has a length, CL, that extends from one of the corner radiuses to an adjacent corner radius, and
   wherein the cutting edge starts at a point, B, and tapers downward to a point, C, for a distance equal to 0.10 to 0.20 times the length, CL, of the cutting edge, and wherein the cutting edge tapers downward from the point, C, to a point, D, for a distance equal to 0.45 to 0.60 times the length, CL, of the cutting edge to a maximum drop of the cutting edge.

2. The cutting insert according to claim 1, wherein a length, CL, of each cutting edge can be described by the following equation:

$$CL = IC \tan(20°) - CR,$$

where,
IC is a diameter of an inscribed circle of the cutting insert, and
CR is equal to a magnitude of the corner radius.

3. The cutting insert according to claim 1, wherein the cutting edge is formed with a first radius, R1, proximate the point B and a second radius, R2, proximate the point C, wherein the first radius, R1, is smaller than the second radius, R2.

4. The cutting insert according to claim 1, wherein an amount of downward taper from the point B to the point C is equal to one-half of the maximum drop of the cutting edge.

5. The cutting insert according to claim 1, wherein the maximum drop of the cutting edge is equal to 0.10 to 0.30 times a thickness, T, of the cutting insert.

6. The cutting insert according to claim 1, wherein the cutting edge is formed with a third radius, R3, proximate the point D, wherein the third radius, R3, is larger than the first radius, R1, and the second radius, R2.

7. The cutting insert according to claim 1, wherein the cutting edge tapers upward from the point D to a point E for a distance equal to 0.20 to 0.45 times the length, CL, of the cutting edge.

8. The cutting insert according to claim 7, wherein the cutting edge is formed with a fourth radius, R4, proximate the point E, wherein the fourth radius, R4, is smaller than the first radius, R1, the second radius, R2, and the third radius, R3.

9. A double-sided, nonagon cutting insert, comprising:
a top surface;
a bottom surface identical to the top surface;
a plurality of side surfaces that are identical to each other;
a cutting edge formed at an intersection between each of the plurality of side surfaces and the top and bottom surfaces; and
a plurality of corner radiuses identical to each other, each corner radius extending between the top and bottom surfaces and each of the plurality of side surfaces,
wherein each cutting edge has a length, CL, that extends from one of the corner radiuses to an adjacent corner radius, and
wherein the cutting edge starts at a point, B, and tapers downward to a point, C, for a distance equal to 0.10 to 0.20 times the length, CL, of the cutting edge, and
wherein the cutting edge tapers downward from the point, C, to a point, D, for a distance equal to 0.45 to 0.60 times the length, CL, of the cutting edge (18) to the maximum drop of the cutting insert, and wherein the cutting edge tapers upward from the point D to a point E for a distance equal to 0.20 to 0.45 times the length, CL, of the cutting edge.

10. The cutting insert according to claim 9, wherein the length, CL, of each cutting edge can be described by the following equation:

$$CL = IC \tan(20°) - CR,$$

where,
IC is a diameter of an inscribed circle of the cutting insert, and
CR is equal to a magnitude of the corner radius.

11. The cutting insert according to claim 9, wherein an amount of downward taper from the point, B, to the point, C, is equal to one-half of a maximum drop of the cutting edge.

12. The cutting insert according to claim 11, wherein the maximum drop of the cutting edge is equal to 0.10 to 0.30 times a thickness, T, of the cutting insert.

13. The cutting insert according to claim 9, wherein the cutting edge is formed with a first radius, R1, proximate the point B and a second radius, R2, proximate the point C, wherein the first radius, R1, is smaller than the second radius, R2.

14. The cutting insert according to claim 13, wherein the cutting edge is formed with a third radius, R3, proximate the point D, wherein the third radius, R3, is larger than the first radius, R1, and the second radius, R2.

15. The cutting insert according to claim 14, wherein the cutting edge is formed with a fourth radius, R4, proximate the point E, wherein the fourth radius, R4, is smaller than the first radius, R1, the second radius, R2, and the third radius, R3.

16. A double-sided, nonagon cutting insert, comprising:
a top surface including a substantially planar central region;
a bottom surface identical to the top surface;
nine side surfaces that are identical to each other;
a cutting edge formed at an intersection between each of the nine side surfaces and the top and bottom surfaces for a total of eighteen cutting edges;
nine corner radiuses identical to each other, each corner radius extending between the top and bottom surfaces and each of the nine side surfaces;
a rake face extending radially inward from each cutting edge; and
a transition region extending between the rake face and the central region,
wherein each cutting edge has a non-symmetric profile with respect to a central, longitudinal axis of the cutting insert.

17. The cutting insert according to claim 16, wherein the rake face is higher in elevation than the central region.

18. The cutting insert according to claim 16, wherein the transition region slopes downward from the rake face toward the central region.

19. The cutting insert according to claim 16, wherein the substantially planar central region surrounds a countersunk bore.

* * * * *